United States Patent
McAuliffe

(10) Patent No.: US 9,458,881 B2
(45) Date of Patent: Oct. 4, 2016

(54) AIR CYCLE MACHINE WITH BEARING FAILURE DETECTION

(71) Applicant: Hamilton Sundstrand Corporation, Windsor Locks, CT (US)

(72) Inventor: Christopher McAuliffe, Windsor, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 0 days.

(21) Appl. No.: 15/065,186

(22) Filed: Mar. 9, 2016

(65) Prior Publication Data

US 2016/0186801 A1 Jun. 30, 2016

Related U.S. Application Data

(62) Division of application No. 14/540,755, filed on Nov. 13, 2014.

(51) Int. Cl.

| F16C 32/06 | (2006.01) |
|---|---|
| F16C 19/52 | (2006.01) |
| B64D 13/06 | (2006.01) |
| B64D 13/08 | (2006.01) |
| G01M 13/04 | (2006.01) |
| G08B 21/18 | (2006.01) |

(52) U.S. Cl.
CPC .............. *F16C 19/525* (2013.01); *B64D 13/06* (2013.01); *B64D 13/08* (2013.01); *G01M 13/04* (2013.01); *G08B 21/182* (2013.01)

(58) Field of Classification Search
CPC . F16C 17/024; F16C 17/042; F16C 32/0677
USPC ............... 384/103–106, 112, 113, 119, 124; 415/118
See application file for complete search history.

(56) References Cited

U.S. PATENT DOCUMENTS

| 5,113,670 A | 5/1992 | McAuliffe et al. |
| 6,770,993 B1 * | 8/2004 | Heshmat .............. F16C 17/024 310/90.5 |
| 6,965,181 B1 * | 11/2005 | Heshmat et al. ..... F16C 17/024 310/90.5 |
| 2009/0324148 A1 * | 12/2009 | Ruggiero et al. ..... F16C 17/024 384/103 |

FOREIGN PATENT DOCUMENTS

| EP | 0029736 A1 | 6/1981 |
| GB | 2077438 A | 12/1981 |

OTHER PUBLICATIONS

International Search Report, International Application No./Patent No. 15194272.9-1555, Date of Mailing Mar. 29, 2016, European Intellectual Property Office; International Search Report 8 pages.

* cited by examiner

*Primary Examiner* — Phillip A Johnson
(74) *Attorney, Agent, or Firm* — Cantor Colburn LLP

(57) ABSTRACT

A bearing monitoring system is provided including one or more bearings within a flow passage and a working fluid passing over at least one surface of the bearings. A first thermocouple is located in the flow passage upstream relative to the one or more bearings and configured to measure a first temperature of the working fluid and a second thermocouple is located in the flow passage downstream relative to the one or more bearings and configured to measure a second temperature of the working fluid. The system further includes a control device in communication with the first thermocouple and the second thermocouple, and configured to compute a temperature gradient across the one or more bearings from the first temperature and the second temperature, compare the temperature gradient against a known value, and if the temperature gradient exceeds the known value, the control device is configured to provide an alert.

9 Claims, 4 Drawing Sheets

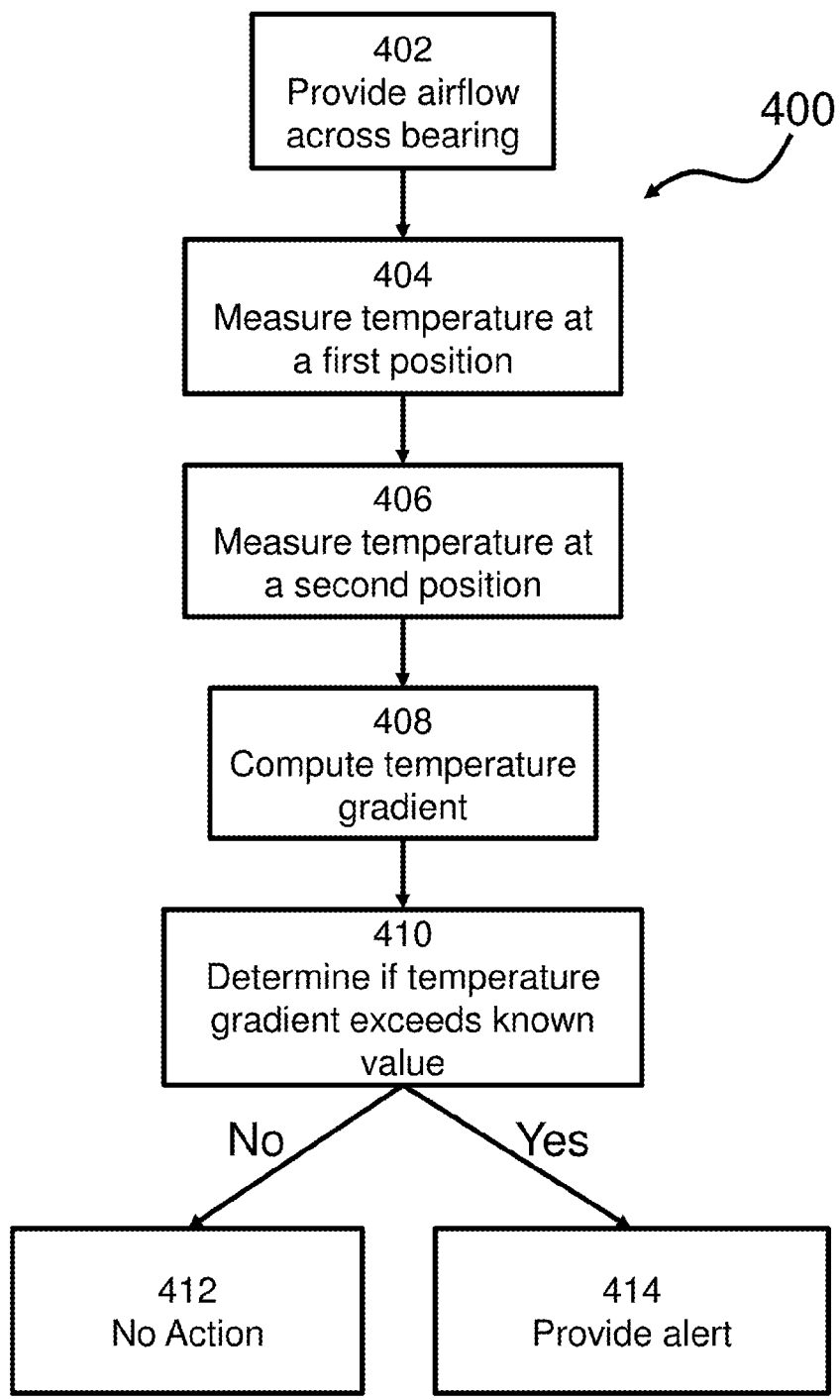

AIR CYCLE MACHINE WITH BEARING FAILURE DETECTION

CROSS REFERENCE TO RELATED APPLICATION

This application is a divisional application of U.S. Ser. No. 14/540,755, filed Nov. 13, 2014, the contents of which are incorporated by reference herein in their entirety.

BACKGROUND OF THE INVENTION

The embodiments herein generally relate to methods and systems for monitoring bearings and more particularly to air cycle machines with bearing failure detection systems and associated methods.

Hydrodynamic fluid film journal bearings, also called journal air bearings or foil bearings, can be used to provide support to rotatable components such as shafts. A typical journal bearing may include a journal sleeve, a bump foil, an intermediate foil, and a top foil. The bump foil, the intermediate foil, and the top foil are wrapped inside the journal sleeve in a substantially cylindrical shape, and the foils are positioned between the journal sleeve and the rotatable component. Each foil has an end that is engaged to the journal sleeve, and can have another end that is free, i.e., not engaged to the journal sleeve. During operation, rotation of the rotatable component causes a working fluid to form a cushion (often referred to as an "air bearing") that supports the rotatable component with little or no direct contact between the rotatable component and the foils of the bearing. Journal bearings provide fluid cushions for radial loads.

Similarly, hydrodynamic fluid film thrust bearings generate a lubricating non-linear air film between a portion of a rotating shaft or other rotatable component and the bearing. One typical bearing arrangement utilizes welded subassemblies. A top subassembly includes an annular main plate having multiple arcuate, corrugated foils welded to the main plate. A corresponding number of arcuate top foils are supported by bump foils. A bottom subassembly includes another annular main plate having multiple arcuate bump foils welded to the main plate. Thus, during operation, rotation of the rotatable component or shaft causes a working fluid to form in and around the corrugated foils to provide an air bearing. The bump foils provide a desired spring rate to cushion the rotatable component as the shaft moves axially. Thus, thrust bearings provide fluid cushions for axial loads.

During operation, the bearings may be rotated at high speeds which results in heat generation. The heat can lead to failure of the bearings by compromising the structural integrity of the components of the bearings. To reduce the risk of failure of the bearings, cooling air is conveyed and passed over bearing surfaces to remove the heat from the bearing.

BRIEF DESCRIPTION OF THE INVENTION

According to one embodiment, a bearing monitoring system is provided. The system includes one or more bearings with a flow passage configured to permit a working fluid to pass over at least one surface of the one or more bearings. Further, a first thermocouple is located in the flow passage at a first position upstream relative to a segment of the one or more bearings and configured to measure a first temperature of the working fluid and a second thermocouple is located in the flow passage at a second position downstream relative to the segment of the one or more bearings and configured to measure a second temperature of the working fluid. The system further includes a control device in communication with the first thermocouple and the second thermocouple, the control device configured to (i) compute a temperature gradient across the one or more bearings from the first temperature and the second temperature, (ii) compare the temperature gradient against a known value, and (iii) if the temperature gradient exceeds the known value the control device is configured to provide an alert.

According to another embodiment, a method of monitoring bearings is provided. The method includes passing a working fluid over a surface of one or more bearings. Further, a first temperature of the working fluid is measured at a first position that is upstream relative to a segment of the one or more bearings and a second temperature of the working fluid is measured at a second position that is downstream relative to the segment of the one or more bearings. A temperature gradient from the first temperature and the second temperature is computed and the temperature gradient is compared to a known value. If the temperature gradient exceeds the known value, an alert is provided.

Technical effects of embodiments of the invention include providing a monitoring system for predicting bearing failure.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

FIG. 4 is a flow chart of a method of monitoring the health of bearings in accordance with an exemplary embodiment of the invention.

DETAILED DESCRIPTION OF THE INVENTION

The present invention, in general, provides a monitoring system and process for hydrodynamic fluid film bearing assemblies that is relatively simple and easy to employ and predicts and/or detects bearing failure prior to complete failure. The monitoring system helps to reduce or eliminate problems associated with bearing failure. Further, the monitoring systems and methods disclosed herein can be employed in existing air cycle machines without substantial modification.

Figure 1:
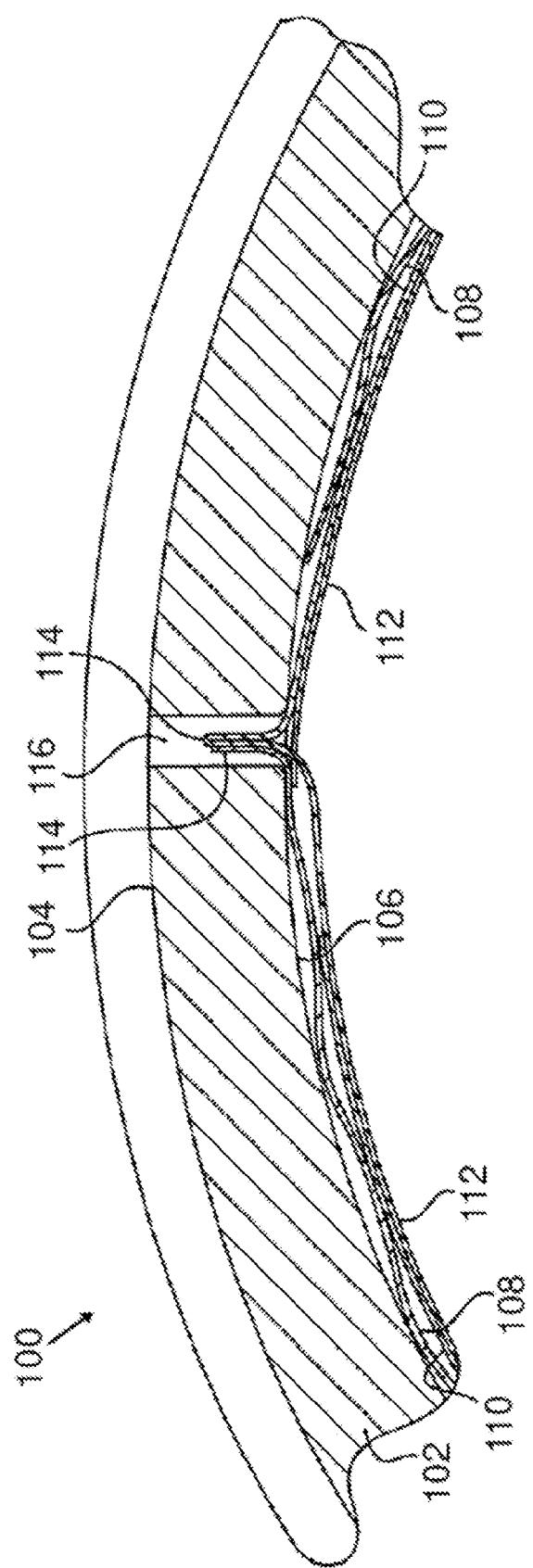
FIG. 1 is a partial cross-sectional view of an exemplary journal bearing.

FIG. 1 is a cross-sectional view of an exemplary hydrodynamic fluid film journal bearing assembly ("journal bearing 100"), which represents one type of foil hydrodynamic bearing that may employ embodiments of the invention. The journal bearing 100 includes a journal sleeve 102 that defines an outer diameter surface 104 and an inner diameter surface 106. The journal sleeve 102 is substantially cylindrical and is arranged about a central axis. It should be noted that the journal sleeve can have a conventional cylindrical shape, or can be shaped with a weight-reduced profile, or configured as other shapes or configurations, and FIG. 1 merely presents an exemplary configuration of a journal bearing 100.

In FIG. 1, a number of foils are arranged inside the journal sleeve 102. The journal bearing 100 includes a bump foil 108, an intermediate foil 110, and a top foil 122. The bump foil 108, the intermediate foil 110, and the top foil 112 are each formed from thin sheets of material (e.g., nickel-based alloys, steel, or similar materials) wrapped in a generally cylindrical shape and positioned in a bore of the journal sleeve 102. The bump foil 108 is corrugated, allowing a working fluid and/or cooling fluid to flow through the spaces formed between adjacent corrugations. The bump foil 108 is positioned adjacent to the inner diameter surface 106 of the journal sleeve 102. The foils 108, 110, and 112 are retained relative to the journal sleeve 102 with bent portions 114 that engage a key slot 116.

A rotatable component like a shaft (not shown) can be positioned inside the journal bearing 100, radially inward from the top foil 112. A radially inner surface of the top foil 112 exposed to the rotatable component can optionally be coated with a suitable dry film lubricant. Use of such a dry film lubricant can reduce friction caused by the rotatable component contacting the top foil 112 when accelerating to operating speed, when decelerating from operating speed, when stopped, and when subject to incidental contact with the top foil 122 during regular operation. Even with the application of a dry film lubricant, during operation heat is generated on the surfaces of the foils 108, 110, and 112 of journal bearing 100, which can lead to structural failure of the journal bearing 100. Accordingly, moving air is passed over the surfaces of the journal bearing 100 to remove the heat and prevent the journal bearing 100 from overheating and failing. However, under atypical system operation, loads exceeding bearing capacity will be imposed on a bearing leading to an associated increase in bearing cooling flow temperature and bearing failure.

Figure 2:
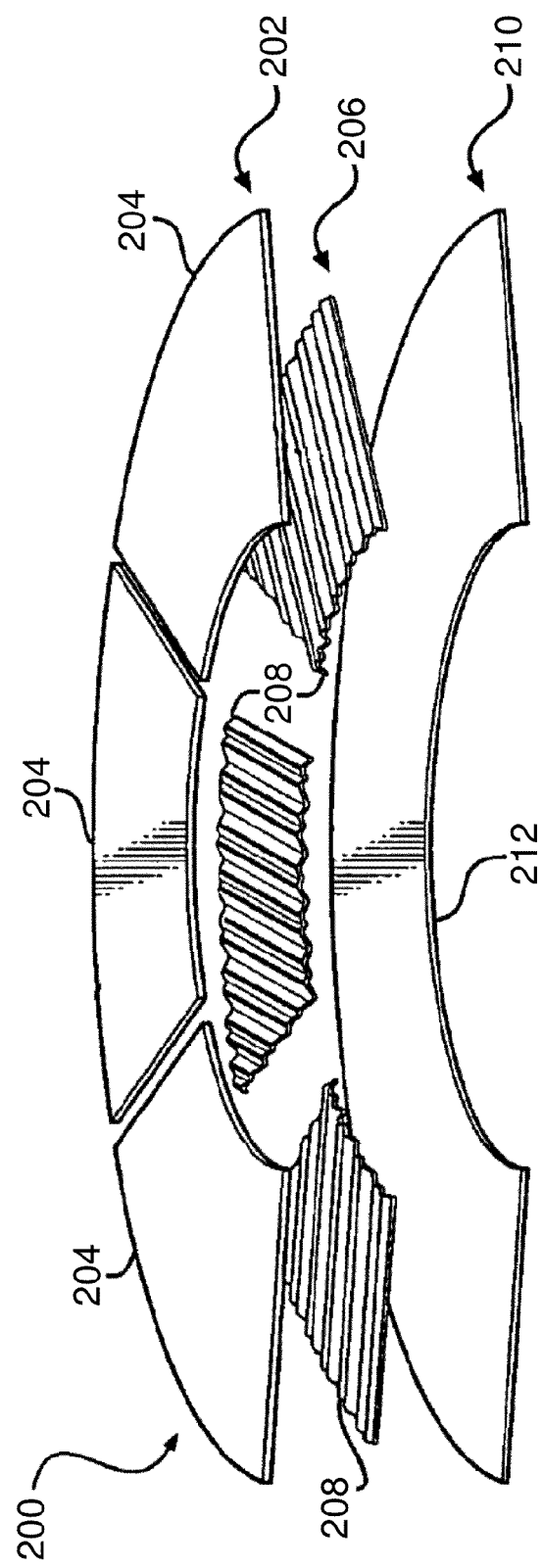
FIG. 2 is a partial exploded view of an exemplary thrust bearing.

Now referring to FIG. 2, an exploded view of an exemplary hydrodynamic fluid film thrust bearing assembly ("thrust bearing 200"), which represents another type of foil hydrodynamic bearing that may employ embodiments of the invention, is shown. The thrust bearing 200 of FIG. 2 has a different construction than the journal bearing 100 of FIG. 1. This is because journal bearings, such as shown in FIG. 1, operate with radial loads, whereas thrust bearings, as shown in FIG. 2, operate with axial loads. However, both types of bearings operate similarly by employing hydrodynamic fluid films, such as air or other fluids, to both provide bearing lubricant and cooling flows to prevent overheating.

The thrust bearing 200 includes three layers, but may include more or fewer layers. A first layer 202 comprises multiple arcuate top foils 204 that are spaced circumferentially relative to one another about a central axis. The top foils 204 are supported by a second layer 206 having a corresponding number of arcuate bump foils 208 arranged circumferentially beneath the top foils 204. The bump foils 208 are corrugated to provide cushioning and accommodate a cooling airflow through the thrust bearing 200. A third layer 210 is provided as an annular main plate 212 that supports the bump foils 208. Similar to a journal bearing, the top foils 204 of the thrust bearing may be coated in a dry film lubricant. The three layers 202, 206, and 210 may be secured to one another, for example, by spot welding.

Similar to the journal bearing 100 of FIG. 1, moving air is passed over the surfaces of the thrust bearing 200 to remove the heat and prevent the thrust bearing 200 from overheating and failing. However, again, under atypical system operation, loads exceeding bearing capacity will be imposed on a bearing leading to an associated increase in bearing cooling flow temperatures and to bearing failure.

The above described hydrodynamic bearings can be employed in air cycle machines of aircraft. The hydrodynamic bearings provide a long lasting bearing with minimal to no required maintenance. This is because the bearings employ air as both a lubricating fluid and as a cooling fluid. This means that no lubricating or cooling liquids, such as oils, need to be replaced over time.

Figure 3:
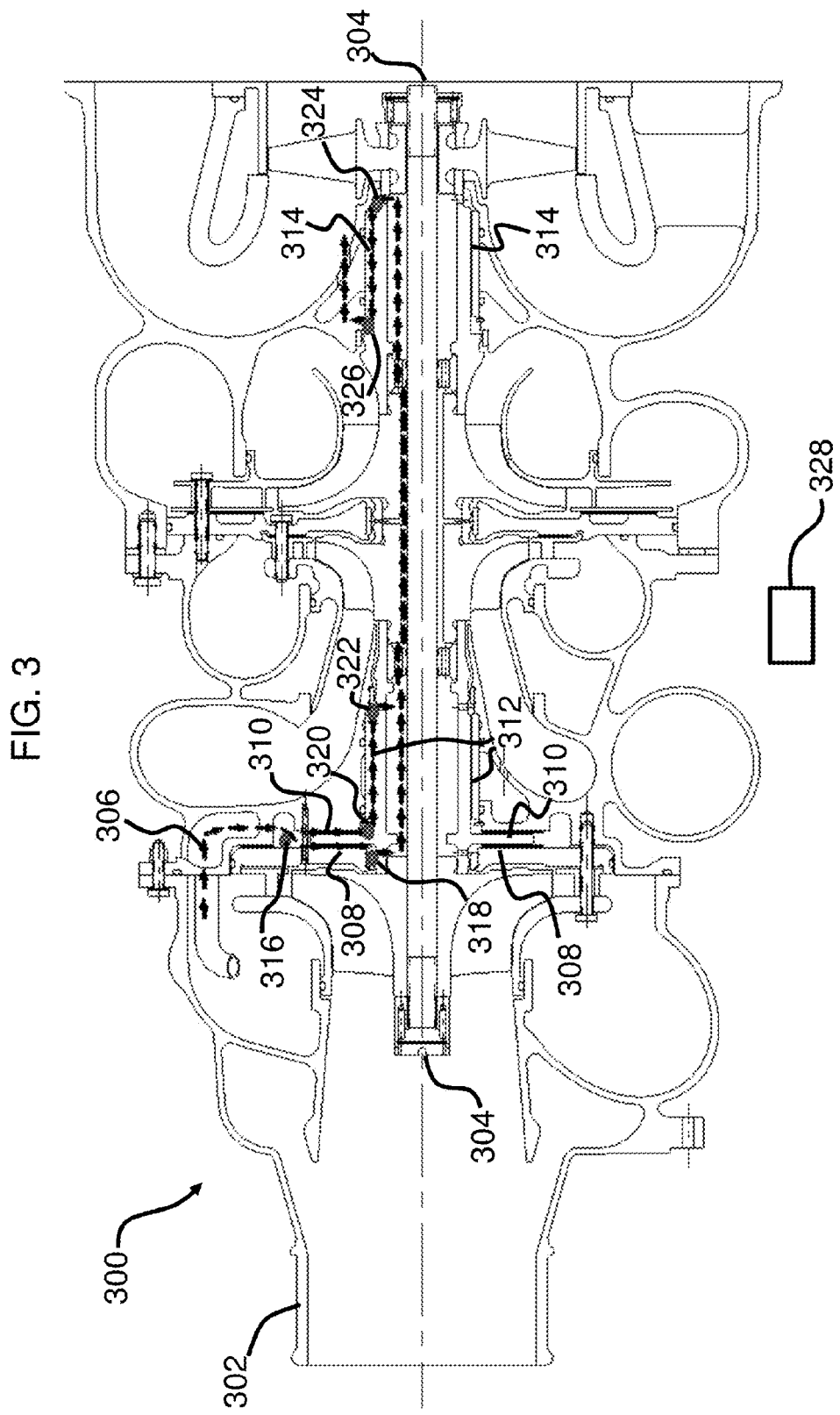
FIG. 3 is a schematic cross-sectional view of an engine including an air cycle machine in accordance with an exemplary embodiment of the invention.

Turning now to FIG. 3, an air cycle machine 300 is part of an environmental control system that is configured to supply conditioned air, for example, to a cabin of an aircraft. The air cycle machine 300 is a four-wheel air cycle machine, with four rotors on a single shaft 304. The four rotors are fixed together and are supported by bearing elements. There are, thus, four bearings configured within the air cycle machine 300 which are arranged along an airflow passage 306, which is represented by the path of arrows in FIG. 3. The air flow passage 306 provides air as both a lubricating fluid for the hydrodynamic bearings and as a cooling air flow to remove heat generated by the bearings during operation.

In the exemplary configuration of FIG. 3, two of the four bearings are thrust bearings and two are journal bearings, as described above. The thrust bearings are located at the inlet side of the airflow passage 306, with the journal bearings located further downstream in the airflow passage 306. A first thrust bearing 308 is configured as an outboard thrust bearing and a second thrust bearing 310 is configured as an inboard thrust bearing. After the thrust bearings 308 and 310, in the direction of the airflow passage 306, a first journal bearing 312 is configured as a turbine journal bearing and then, toward the outlet of the airflow passage 306, a second journal bearing 314 is configured as a fan journal bearing. The thrust bearings 308 and 310 are configured to operate with axial loads, and the journal bearings 312 and 314 are configured to operate with radial loads within the engine 302.

As a non-limiting example, the air cycle machine 300 may operate at 20,000-50,000 RPM. However, other rotational speeds of operation may be used without departing from the scope of the invention. As such, during operation, each of the bearings 308, 310, 312, and 314 will generate heat due to viscous shear of the hydrodynamically generated film of air between the bearing top foil and the rotating shaft which can lead to structural failure of the bearings. To dissipate the heat, air flows through airflow passage 306 and passes over the bearings 308, 310, 312, and 314 to provide a cooling factor through and/or over the bearings. However, the heat can cause damage to the bearings, even with the cooling factor provided by the air flow within airflow passage 306. Further, other types of damage may occur to the bearings, such as material entering the airflow passage 306 and causing damage to the bearings, impacts, aging, etc. Any damage to a bearing can lead to failure of that bearing, and thus cause significant problems, particularly if the failure occurs during flight of an aircraft.

When failure of a bearing occurs, the high heat associated with the high speed rotors, which are support by the air bearings, contact static structures resulting in smoke and/or other particles forming which may enter an aircraft cabin and/or the hot air itself may be pumped into a cabin resulting in unacceptable conditions for occupants of the cabin. Further, during failure the bearings may break apart and cause additional damage to the air cycle machine, to the environmental control system the air cycle machine is connected to and/or to other components of the aircraft. Thus, bearing failure can be dangerous and costly. Currently, failure of a bearing may only be determined after failure occurs, such as when smoke enters a cabin or environmental control system performance is noticeably degraded. However, pre-failure systems that provide prediction, detection, and/or early warning of failing bearings do not exist.

One indicator of bearing failure is high temperature bearing surfaces. For example, when a bearing is approaching failure, the bearing will not operate efficiently and thus power losses increase. The power losses mean higher temperatures.

The heat generated during normal operation is relatively low because there is little power loss in the system due to friction and other factors. When the cooling air passes over the surfaces of the bearings, the air is heated. Accordingly, a temperature gradient exists across the surface of the bearing, with a low temperature existing at a first point that is prior to a bearing surface along the direction of air flow and the temperature rises as it passes over the heated bearing surfaces, reaching a maximum temperature at the end of the bearing surfaces in the flow direction.

In contrast, as a bearing begins to fail or to exhibit characteristics of potential failure, the power loss of the bearing will increase and the temperature of the bearing will increase. Thus, the cooling air heats faster and to higher temperatures as the air passes over the surfaces of the bearing. As a result, there is a larger temperature gradient along a failing bearing from an upstream point to a downstream point, when compared to a normally operating bearing.

As a non-limiting example, under normal operating conditions, a temperature gradient ("ΔT") across or along a bearing may be between about 0° F./−18° C. and about 50° F./10° C., and more particularly between about 15° F./−9° C. and about 25° F./−4° C. If a bearing completely fails, the temperature gradient may be about 100° F./38° C. or more. However, if a bearing is approaching failure, but has not yet failed, the gradient may be about 50° F./10° C. or more. Accordingly, there are approximately three ranges of operating temperature gradients ΔT for the bearings. A first range that is below about 50° F./10° C. which indicates normal or typical operating conditions; a second range of between about 50° F./10° C. and about 100° F./38° C. which indicates a fault, potential failure, or other negative operating condition; and a third range which is above about 100° F./38° C. which indicates complete failure of the bearing. Although various specific operating temperatures and ranges of temperatures are disclosed herein, the ranges and temperatures may vary depending on the operational characteristics of the machines. Thus, the above described temperatures and ranges are presented for illustrative purposes only, and those skilled in the art will appreciate that other temperatures and ranges may be employed without departing from the scope of the invention.

In view of the above, thermocouples may be located near or proximal to each bearing 308, 310, 312, and 314, within an air cycle machine 300. The thermocouples are configured to measure inlet and outlet temperatures of the air passing over surfaces of the bearings, and thus monitor the temperature gradients across the bearing surfaces. For example, an inlet thermocouple 316 is provided proximal to an upstream location of both thrust bearings 308 and 310. The thrust bearings 308 and 310 share the same inlet thermocouple 316 for measuring the air temperature at a first position that is before passing over the bearings in the airflow direction. However, an outlet thermocouple 318 is located proximal to a downstream location of thrust bearing 308 and a different outlet thermocouple 320 is located proximal to a downstream location of thrust bearing 310. The inlet thermocouple 316 and the outlet thermocouple 318 are configured to determine a temperature gradient $\Delta T_1$ across the first thrust bearing 308. Whereas, the inlet thermocouple 316 and the outlet thermocouple 320 are configured to determine a temperature gradient $\Delta T_2$ across the second thrust bearing 310. In an alternative embodiment, each thrust bearing 308 and 310 may have separate thermocouples at the inlet and the outlet of the bearing.

The outlet thermocouple 320, which is located at the outlet of thrust bearing 310, is also configured as the inlet thermocouple for the journal bearing 312. At the outlet of the journal bearing 312 an outlet thermocouple 322 is configured to measure the temperature of the air. Thus, a temperature gradient $\Delta T_3$ across the first journal bearing 312 is measured. Finally, an inlet thermocouple 324 and an outlet thermocouple 326 are located at the inlet and outlet sections of the second journal bearing 314, respectively, and are configured to measure a temperature gradient $\Delta T_4$ across the second journal bearing 314.

Each of the thermocouples, arranged as described above, are configured to measure temperatures at inlet, or upstream, and outlet, or downstream, points relative to the bearings. Temperature gradients across the bearings of the air cycle machine 300 can then be computed based on the temperatures measured by the thermocouples. For example, the thermocouples can be configured to communicate with a control device, computer, processor, notification device, or other similar device, or may be wired or be in communication with a more comprehensive system that controls the air cycle machine 300, the engine 302, an environmental control system, or other component or system, hereinafter "control device 328." The control device 328 is configured to compute temperature gradients by comparing the outlet temperatures to the inlet temperatures for each bearing.

The control device 328 can be configured to provide an alert when failure is possible, as indicated by a temperature gradient that is outside of normal operating conditions. For example, when a temperature gradient of about 50° F./10° C. or greater is detected across a bearing, i.e., indicating conditions of fault or potential failure, the control device 328 will indicate that the bearing should be inspected, repaired, and/or replaced. Advantageously, this process can provide an alert or notification prior to failure of the bearing during operation. Such alerts or notifications may take the form of a status message presented on a console in the cockpit of an aircraft. However, those skilled in the art will appreciate that any type of alert, indicator, and/or notification may be employed without departing from the scope of the invention.

Turning now to FIG. 4, a flow chart of a monitoring process 400 in accordance with an exemplary embodiment of the invention is shown. At step 402, air flow is passed over a bearing surface, for example as described above. At step 404 the temperature of the air is measured at a first position, such as an upstream position relative to a bearing to be monitored. At step 406, the air temperature is measured at a second position that may be a downstream position relative to the bearing. Thus, during steps 404 and 406, the lowest temperature is measured (upstream) and the highest temperature is measured (downstream) relative to a single bearing.

With the two measurements obtained in steps 404 and 406, a temperature gradient is computed or calculated at step 408, which represents the change in temperature of the air as it passes over a surface of the bearing. The temperature gradient calculated in step 408 is then compared against predetermined and/or known values and/or thresholds at step 410. The known values reflect known temperature gradients that represent different statuses of the bearings, as described above. By comparing the measured temperature gradient to known values, it can be determined if the bearing that is being monitored is operating under normal conditions or if the bearing is operating under conditions that exhibit evidence of potential failure of the bearing.

If it is determined at step 410 that the temperature gradient indicates normal operating conditions, no action is taken by the system at step 412, and the process returns to step 404. However, if it is determined at step 410 that the temperature is above a threshold, and thus indicates a failing bearing, an alert can be provided or other action taken, at step 414.

Advantageously, embodiments of the invention allow for an air cycle machine to be configured to detect and avoid bearing failure. For example, as a load increases on a bearing, such as in a progressively increasing load situation, the temperature may increase across the bearing. Monitoring this temperature enables early notification of potential bearing failure. Thus, the structural health and operating conditions of bearings may be monitored to prevent and avoid failure.

Advantageously, in accordance with embodiments of the invention, with known values that indicate a bearing that is potentially going to fail, but has not yet failed, one can determine if a bearing is operating under normal conditions, in a condition that is potentially going to fail, or has failed. Measurement of the temperature of a working fluid that passes over surfaces of a bearing enables simple monitoring without modifying the structure or configurations of bearings. Further, advantageously, embodiments disclosed herein may be installed on already existing systems without significant modification.

While the invention has been described in detail in connection with only a limited number of embodiments, it should be readily understood that the invention is not limited to such disclosed embodiments. Rather, the invention can be modified to incorporate any number of variations, alterations, substitutions, combination, sub-combination, or equivalent arrangements not heretofore described, but which are commensurate with the spirit and scope of the invention. Additionally, while various embodiments of the invention have been described, it is to be understood that aspects of the invention may include only some of the described embodiments.

For example, although described herein as an air cycle machine for an aircraft, those of skill in the art will appreciate that the disclosed monitoring system may be employed in other systems that exhibit thermal changes indicating potential failures of parts. Moreover, although a particular air cycle machine has been disclosed above, this is merely exemplary and other configurations, numbers of bearings, numbers of thermocouples, and other features can be changed and/or modified without departing from the scope of the invention.

Furthermore, although described herein as air bearings, other types of bearings that use alternative fluid flows for cooling and/or lubricant may employ thermocouples and similar monitoring processes without departing from the scope of the invention.

Additionally, although described with measurements obtained upstream and downstream relative to a bearing, the measurement points can be made at any point relative to a bearing, such that a gradient can be determined. Moreover, the temperature measurements and determinations made herein are not merely limited temperature gradients, but rather absolute temperatures measured at individual locations may be measured and compared against known values in order to monitor for potential bearing failure. Furthermore, although exemplary temperatures have been disclosed herein, such temperatures are merely exemplary and other temperatures and/or temperature gradients may be used or more appropriate depending on the conditions of the bearings to be monitored.

Additionally, in some embodiments, the thermocouples and control device can be configured provide notification of potential failure and actual failure. As such, the system disclosed herein may be used to determine fault isolation and readily determine and pin-point a specific bearing that has failed or may potentially fails.

Accordingly, the invention is not to be seen as limited by the foregoing description, but is only limited by the scope of the appended claims.

What is claimed is:

1. A method of monitoring bearings comprising:
   passing a working fluid through a flow passage over a surface of thin foil hydrodynamic bearings;
   measuring a first temperature of the working fluid at a first position that is upstream relative to a segment of the thin foil hydrodynamic bearings;
   measuring a second temperature of the working fluid at a second position that is downstream relative to the segment of the thin foil hydrodynamic bearings;
   wherein the measuring of the first temperature and the second temperature are measure by thermocouples;
   computing a temperature gradient from the first temperature and the second temperature;
   comparing the temperature gradient to a known value; and
   providing an alert if the temperature gradient exceeds the known value.

2. The method of claim 1, wherein the thin foil hydrodynamic bearings are at least one of journal bearings and thrust bearings.

3. The method of claim 1, wherein the known value is about 50° F./10° C.

4. The method of claim 1, wherein the thin foil hydrodynamic bearings include a first thin foil bearing and a second thin foil bearing, and the method further comprising:
   determining which of the first thin foil bearing and the second thin foil bearing includes a fault.

5. The method of claim 4, further comprising:
   measuring a third temperature of the working fluid at a third position downstream relative to a segment of the second thin foil bearing;
   measuring a fourth temperature of the working fluid at a fourth position downstream relative to a segment of the first thin foil bearing and upstream relative to the segment of the second thin foil bearing;
   computing a second temperature gradient from the third temperature and the fourth temperature;
   comparing the second temperature gradient against the known value; and
   providing an alert if the second temperature gradient exceeds the known value.

6. The method of claim 1, wherein the method is performed by one or more components of an aircraft.

7. The method of claim 1, wherein the thin foil hydrodynamic bearings includes a first thin foil bearing and a second thin foil bearing, wherein the flow passage is configured to permit the working fluid to pass over a least one surface of the first thin foil bearing and at least one surface of the second thin foil bearing, and the first position is upstream of a segment of the first thin foil bearing and the second position is upstream of a segment of the second thin foil bearing.

8. The method of claim 7, further comprising:
   measuring a third temperature of the working fluid at a third position downstream relative to the segment of the second thin foil bearing;
   computing a second temperature gradient from the second temperature and the third temperature;
   comparing the second temperature gradient against the known value; and
   providing an alert if the second temperature gradient exceeds the known value.

9. The method of claim 8, further comprising determining which of the first thin foil bearing and the second thin foil bearing includes a fault.

\* \* \* \* \*